June 13, 1939.　　　V. D. BARKER　　　2,162,474
FLUID DISPENSING APPARATUS
Filed May 23, 1938　　　4 Sheets-Sheet 2
FIG. II.
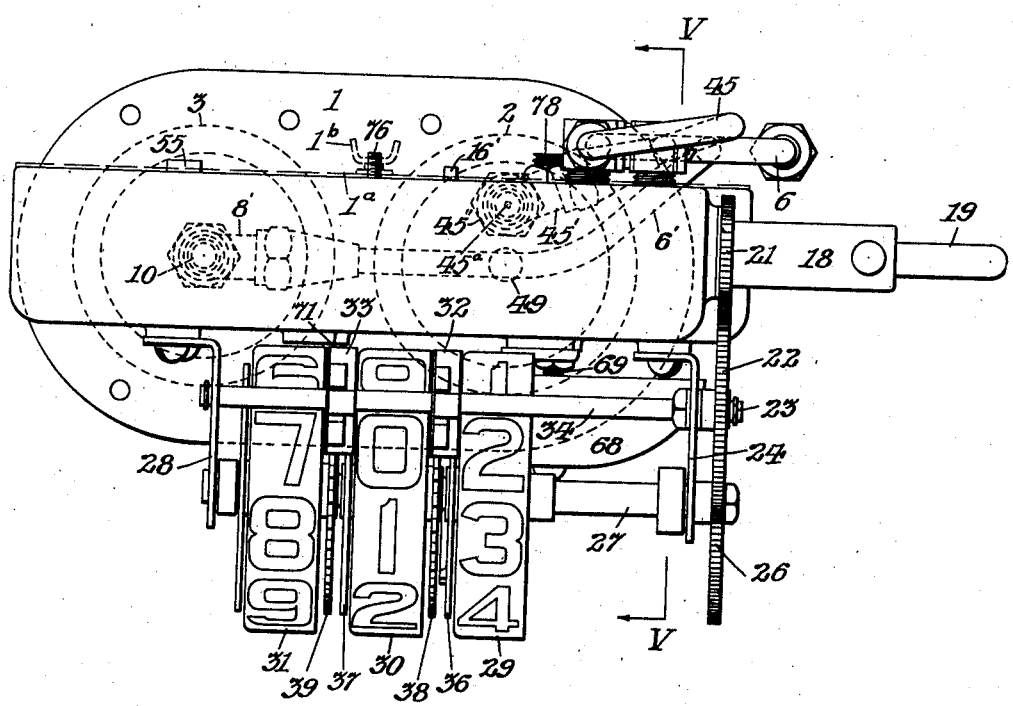
FIG. VI.
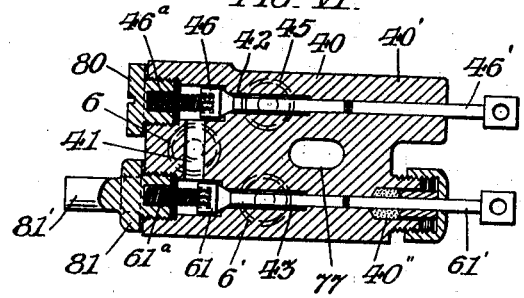
INVENTOR:
VIRGIL D. BARKER,
BY

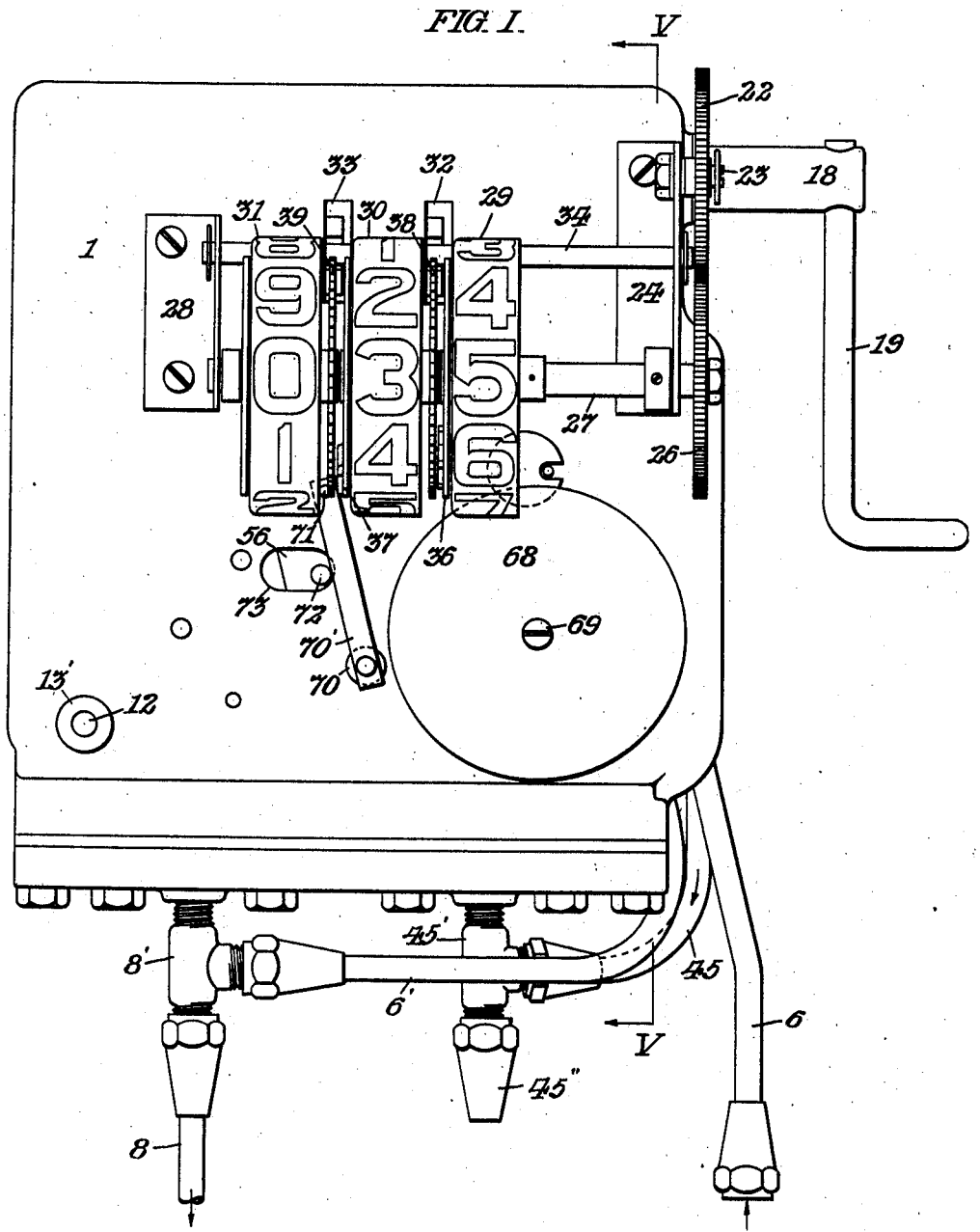

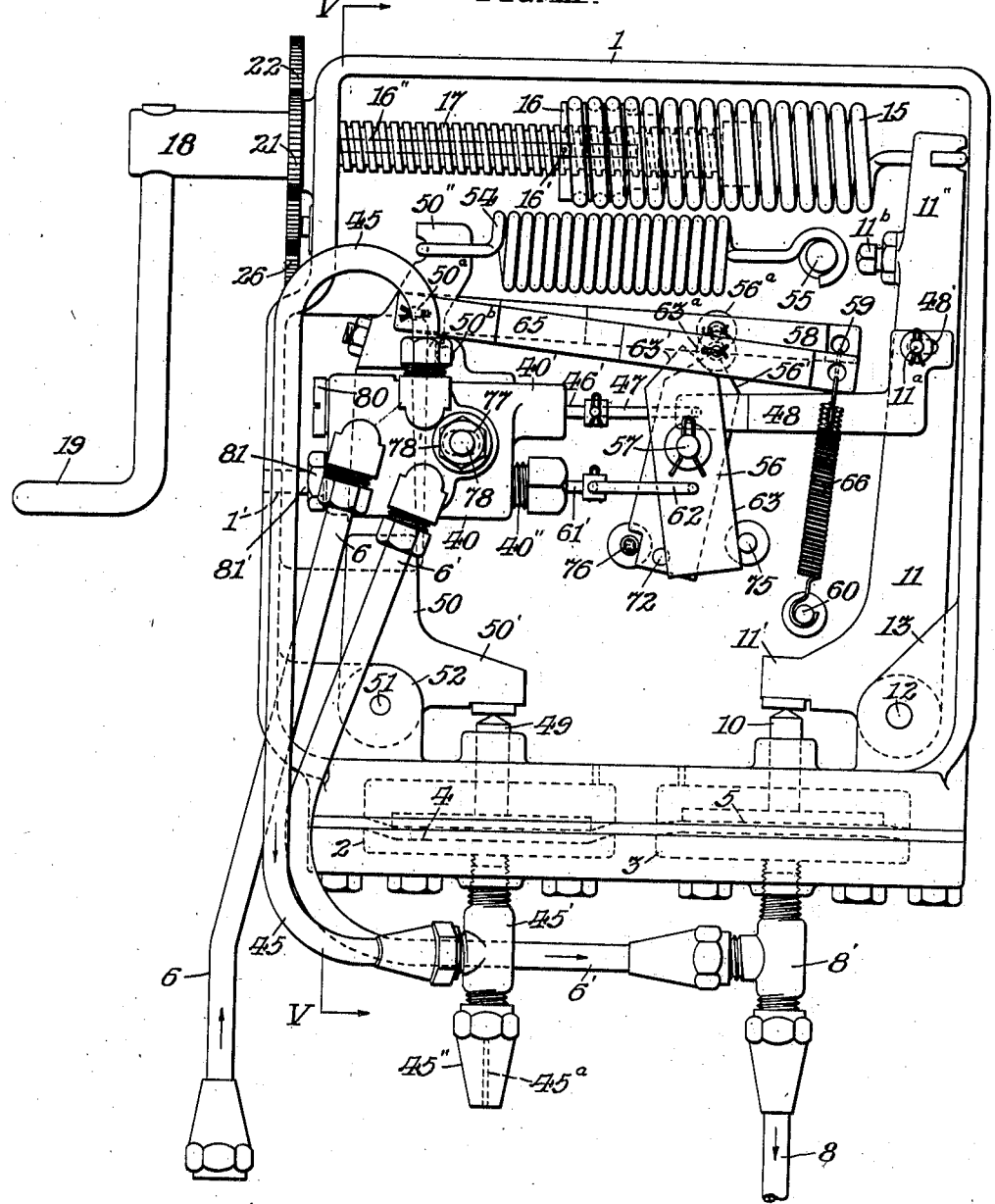

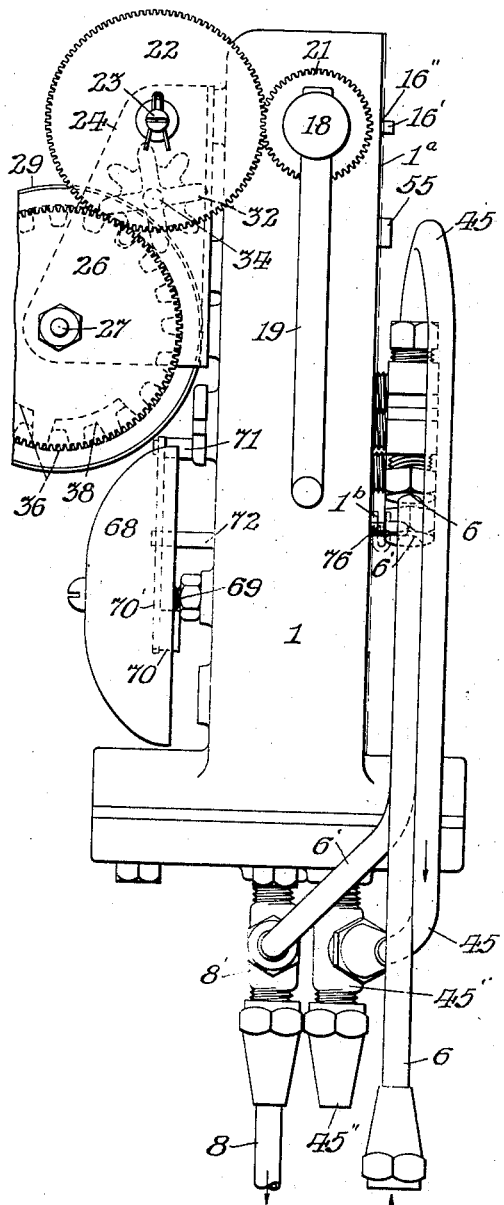

Patented June 13, 1939

2,162,474

UNITED STATES PATENT OFFICE 2,162,474

FLUID DISPENSING APPARATUS

Virgil D. Barker, Westfield, N. J.

Application May 23, 1938, Serial No. 209,422

13 Claims. (Cl. 221—73.5)

Although not limited to any particular embodiment, my invention may be advantageously embodied in apparatus for dispensing air at an automobile service station. At such a station, compressed air is principally used for operation of elevators to lift vehicles to permit them to be greased with facility; to dispense grease under pressure to the bearings of such vehicles, and to inflate the vehicle tires. It is ordinary practice to highly compress air, say to 150 pounds per square inch, by a pump operated by an electric motor, and to store it in a supply tank from which it may be released through dispensing apparatus which is adjustable to predetermine the pressure to which any air receiver may be charged.

Letters Patent of the United States No. 1,655,003 was granted January 3, 1928, to J. C. Woodford and this applicant for Apparatus for supplying air under pressure, of the class above contemplated and operative to dispense compressed air by a succession of pulsations until the back pressure through the dispensing conduit reaches that to which the device is adjusted. That Letters Patent was reissued April 24, 1934, to Service Station Equipment Company, a corporation of the State of Delaware, which has extensively sold apparatus within the description of the claims of said original patent and reissue thereof. The apparatus shown in said patent included an electrically energized audible signal, sounded at each pulsation, and the dispensation of compressed air was controlled by electrical power means and controlling circuits, associated with a single diaphragm chamber containing a flexible diaphragm subjected to air pressure from the dispensing conduit; such air pressure on said diaphragm being opposed by a compressed spring bearing directly on said diaphragm; the pressure of that spring being manually variable and indicated by an index pointer carried by a screw, the rotation of which compressed said spring, which pointer cooperated with a stationary dial marked to indicate pounds pressure of the air dispensed.

The apparatus shown in said patent is so constructed that it, and its associated audible signal, do not always operate in uniformly intermittent cycles when said apparatus is used to inflate a tire to a high pressure approaching that of the pressure of the source of supply of air; particularly during the initial stage of inflation under such conditions. My present invention avoids the necessity of employing electrical power in addition to the power available in the customary compressed air supply, and the cycles are uniform under all conditions, with consequently quicker inflation.

Therefore, the principal object and effect of my present invention is to provide a fluid dispensing apparatus of simple, solely mechanical, design which operates in a uniformly intermittent manner, with a uniform audible signal, over a wide range of combinations of pressure adjustment and initial receiver pressure, without employing any electrical power means or controlling circuit. My invention operates in positively controlled cycles of pulsating charges of fluid to a receiver; each charge of fluid being terminated at a regularly uniform interval after its initiation, independently of either the back pressure in the receiver or the fluid resistance in the service conduit. In addition, my device does not require any appreciable energy drain from, or reduction in, available pressure of a fluid to be delivered to the receiver. This is accomplished by utilizing the energy of the fluid directly from the source to furnish power for operating the apparatus, which fluid is subsequently exhausted to atmosphere.

As hereinafter described, an essential feature of the present invention is the provision of two separate and distinct diaphragm chambers each containing a flexible diaphragm, the fluid pressure upon which is opposed by separate and distinct springs; one of said diaphragms being subjected to fluid pressure from the air dispensing conduit and the other of said diaphragms being subjected to the pressure directly from the supply reservoir. Moreover, the present invention provides an improved construction and arrangement of controlling valves and cam and cam roller levers operatively connected with said two diaphragms and their springs for adjustably controlling the dispensation of the fluid.

My invention comprises the various novel features of construction and arrangement hereinafter more definitely specified and including a bell signaling device for manifesting each pulsation of the apparatus during a dispensing operation.

In said drawings, Fig. I is a front elevation of a casing, connected with a conduit leading from the fluid supply reservoir and a fluid dispensing conduit, and inclosing the two diaphragms and having indicating mechanism including a plurality of adjustable numbered wheels; said casing supporting the signal bell and means for operating it.

Fig. II is a plan view of the structure shown in Fig. I.

Fig. III is a rear elevation of the structure shown in Fig. I, omitting the rear cover plate for said casing.

Fig. IV is an elevation of the right hand side of the structure shown in Figs. I and II.

Fig. V is a vertical sectional view of said structure taken on the line V, V in Figs. I, II, and III.

Fig. VI is a sectional view of the valve casing shown in Fig. III, taken on the line VI, VI in Fig. V.

In said drawings, the main casing 1 incloses two diaphragm chambers 2 and 3, each containing a reciprocatory diaphragm, respectively 4 and 5. The fluid pressure supply conduit 6 from any suitable source of highly compressed air, supplies such air to said diaphragm chambers under automatic valve control, as hereinafter described. The fluid pressure service conduit 8 leads from said chamber 3 and the compressed air is dispensed through it. For the purpose of servicing and inflating automobile tires, said service conduit 8 may have a dispensing hose connected therewith having at the end thereof a suitable connector or chuck for convenient attachment to a tire valve stem; such chuck embodies a spring pressed valve which closes to prevent air from escaping from the hose when not attached to a tire stem, but is automatically opened and automatically unseats the tire valve when the chuck is properly applied to the tire valve stem.

Said diaphragm 5, which is subjected to the fluid pressure in said service conduit 8 has operatively connected therewith the reciprocatory plunger 10. The bell crank lever 11, which is fulcrumed on the shaft 12 in bearings 13, 13' in said casing 1, has its short arm 11' in cooperative relation with said plunger 10 and has its long arm 11" connected with the right hand end of the spring 15. The left hand end of said spring 15 carries the nut 16 which is in threaded engagement with the adjusting screw 17 cut on the shaft 18 extending exterior to said casing 1 and provided with the crank handle 19 by which it may be adjusted. That is to say, the stress of said spring 15 may be increased by turning said crank 19 clockwise or decreased by turning it counterclockwise.

I find it convenient to connect with said shaft 18 indicating means for manifesting in pounds the pressure of fluid to be dispensed for which said spring 15 is manually adjusted. Such means includes the gear pinion 21 on said shaft 18, the intermediate gear 22 which is journaled on the stud 23 mounted in the bracket 24 which is rigidly connected with said casing 1. Said intermediate gear 22 meshes with the indicator gear 26 on the shaft 27 which is journaled in said bracket 24 and the bracket 28 which is also rigidly connected with said casing 1. Said shaft 27 has rigidly connected therewith the wheel 29 having on its circumference a series of numbers from 1 to 9 inclusive and 0. Said wheel 29, which indicates individual pounds, is connected by tens transfer gearing with the similarly numbered wheel 30, each of the numbers on which represents ten pounds, and said wheel 30 is operatively connected with the similarly numbered wheel 31 which represents hundreds of pounds. Such connection is conveniently effected by respective transfer pinions 32 and 33 which are loosely journaled on the shaft 34 carried in said brackets 24 and 28. Said pinions are intermittently turned by respective sectoral gears 36 and 37, respectively carried by said numbered wheels 29 and 30, and said pinions are respectively in mesh with the whole gears 38 and 39 respectively carried by said numbered wheels 30 and 31. That arrangement is such that upon a complete rotation of the successive numbered wheels of lower order, the wheel of the next higher order is turned one-tenth of a revolution. As manifested by said indicating mechanism in Fig. I, the screw 17 has been manually adjusted to insure dispensation of compressed air through the service conduit 8, to charge an automobile tire or other receptacle with a pressure of thirty-five pounds per square inch.

Referring to Figs. III and VI, said supply conduit 6 is connected with the valve casing 40 in communication with the fluid passage 41 therein which connects with the parallel fluid passageways 42 and 43 in said casing 40. The air conduit 45 extends from said passageway 42 to the T-fitting 45' which opens into the diaphragm chamber 2, beneath said diaphragm 4. Said fitting 45' has the vent nozzle 45" leading therefrom to the atmosphere and the vent 45ᵃ therethrough is very much smaller than the cross sectional area of the conduit 45 and passageway 42; the purpose of said vent being to slowly bleed the fluid pressure from beneath said diaphragm 4 when the latter is not held up by fluid pressure through said conduit 45. Passage of the high pressure air from said supply conduit 6 to said diaphragm chamber 2 is controlled by the reciprocatory valve 46 which may be opened by the slidably fitted push rod 46' extending through the bearing 40' on said valve casing 40. Push rod 46' is pivotally connected by the link 47 with the push link 48 which has the slot 48' extending parallel with said push rod 46' and engaging the stud 11ᵃ on said bell crank lever long arm 11"; whereby opening movement of said valve 46 is initiated as hereinafter described.

Said diaphragm 4, which is subjected to the high pressure in said supply conduit 6, when said valve 46 is open, has operatively connected therewith the reciprocatory plunger 49. The bell crank lever 50, which is fulcrumed on the shaft 51 mounted in bearings 52, 52' in said casing 1, has its short arm 50' in cooperative relation with said plunger 49 and has its long arm 50" connected with the left hand end of the spring 54. The right hand end of said spring 54 is connected with the stationary anchor stud 55 in said casing 1. The effect of that arrangement is that the long arm 50" of said bell crank lever 50 is moved to the left in Fig. III when said valve 46 is open and the fluid pressure in the diaphragm chamber 2 beneath the diaphragm 4 overcomes the stress of said spring 54, but, when said valve 46 is closed, that pressure is exhausted through said vent 45ᵃ and the stress of said spring 54 moves said lever 50 clockwise to the position shown in Fig. III, where it is stopped by the stop stud 50ᵇ fixed in said casing 1.

The right hand end of said link 47 is pivotally connected with the rocker cam lever 56 which is mounted to oscillate on the stationary fulcrum stud 57 which is fixed in said casing 1. Said cam lever 56 has at its upper end the pointed cam 56' adapted to rock back and forth in cooperative relation with the cam roller 56ᵃ carried by the cam roller lever 58. Said lever 58 is fulcrumed on the stud 58ᵃ fixed in the long arm 50" of the lever 50, and the opposite end of said lever 58 is connected by the spring 59 with the stationary anchor stud 60 which is fixed in said casing 1. The effect of that arrangement is to continually stress said roller 56ᵃ into cooperative relation with said pointed cam 56' and to snap said rocker cam lever counterclockwise and fully open valve 46, by the roller 56ᵃ, when the crest of cam 56' is pushed, by said link 48, to the left of a line taken through the centers of said roller 56ᵃ and said fulcrum stud 57; which roller is alternately moved back and forth in a substantially horizontal plane by said bell crank lever 50 and cam roller lever 58.

Referring to Figs. III and VI; high pressure air is supplied from said conduit 6 to the diaphragm chamber 3 and service conduit 8 through the supply conduit 6' which has its upper end connected with said valve casing 40 in communication with the air passage 43, and has its lower end connected with the T-fitting 8' which is connected with said diaphragm chamber 3 and with said service conduit 8. The passage of high pressure air from said supply conduit 6 through said passageway 43 to said diaphragm chamber 3 and service conduit 8, is controlled by the valve 61 which has the push rod 61' extending through the stuffing box 40'' on said valve casing 40 to open it and the spring 61ᵃ to shut it. Said push rod 61' is pivotally connected, by the link 62, with the rocker cam lever 63 which is mounted to oscillate on said stationary fulcrum stud 57 fixed in said casing 1. Said cam lever 63 has at its upper end the pointed cam 63' and is adapted to be snapped clockwise to open said valve 61, and to be snapped counterclockwise, to permit said valve to close. Such snap action is effected by the cam roller 63ᵃ which is carried by the cam roller lever 65. Said lever 65 is fulcrumed on said stud 50ᵃ fixed in the long arm 50'' of the lever 50, but on the side of said arm opposite to said lever 58. The opposite end of said lever 65 is connected by the spring 66 with said anchor stud 60 fixed in said casing 1, to continually stress said cam roller 63ᵃ into cooperative relation with the face of said pointed cam 63'.

The combined effect of the two bell crank levers 11 and 50, their springs 15 and 54, and the lever linkage connecting them in the cooperative relation above described, is to dispense the highly compressed air, in pulsations, through the service conduit 8, until the selected pressure, variably predetermined by the adjustment of said screw 17, is attained in the tire, or other air receiver, and, with the adjustment indicated, that pressure would be thirty-five pounds per square inch; whereupon, the instant dispensing operation is automatically terminated.

In order to manifest to the operator the fact when any dispensing operation is continuing; I find it convenient to provide an audible signaling device which is sounded at each pulsation when said cam 56 snaps counterclockwise. Such a device is shown in Fig. I including the bell 68 (which is supported on the standard 69 fixed on the front of casing 1), and the clapper comprising the striker 70 and clapper lever 70', which latter is fulcrumed on the stud 71, which is stationary on the front of casing 1, as indicated in Figs. I and IV.

Said clapper lever 70' normally hangs, with its striker 70 in spaced relation with said bell 68, as indicated in Fig. I, which corresponds with the position of the parts shown in Fig. III. In that position it hangs against the signal crank stud 72 which is fixed in said rocker cam lever 56 and projects through the slot 73 in the front wall of said main casing 1. However, as said cam lever 56 is pushed counterclockwise in Fig. III by the pull of spring 15, when the diaphragm 5 is allowed to fall by the escape of fluid pressure from beneath it into said service conduit 8, when the valve 46 is opened, as above described; said signal crank stud 72 is carried by the cam lever 56 to the left in Fig. I and, as the fluid pressure admitted to the diaphragm chamber 2 turns the bell crank lever 50 counterclockwise, and effects the return of said cam lever 56 toward the position shown in Fig. III, the consequent movement of the signal crank stud 72 to the right in Fig. I swings said clapper lever 70' and thus strikes the signal bell 68 with the striker 70, at the termination of each pulsation of air dispensed. Therefore, when said audible signal ceases to sound, the operator is apprised that the instant dispensing operation is completed by the increment of pressure in the tire or other air receiver to the pressure for which the apparatus has been set by adjustment of said screw 17.

Referring to Fig. III, said stud 55, fixed in casing 1, limits the movement of bell crank lever 11 by spring 15, when the set screw 11ᵇ encounters it. Counterclockwise movement of rocker cam lever 56 in opening valve 46, is stopped by the stop stud 75 fixed in casing 1. The stop stud 76, in casing 1, limits the movement of rocker cam lever 63, in opening valve 61.

To facilitate the assembling of valve casing 40 in the casing 1, I provide the slot 77, extending through valve casing 40 to receive bolt 78 fixed in casing 1. Said bolt is engaged by nut 78' to hold valve casing 40 in casing 1. As shown in Fig. VI, the left hand ends of the air passages 42 and 43 are respectively closed by the screws 80 and 81 and the latter has the cylindrical extension 81' which, as shown in Fig. III, fits in a hole 1' in said casing 1 to insure that said valve casing 40 shall be in proper vertical position. Said screws 80 and 81 are recessed to receive the outer ends of said valve springs 46ᵃ and 61ᵃ, the inner ends of which are respectively seated in recesses in said valves 46 and 61. Said springs continually tend to close said valves upon their seats in the casing 40. I prefer to provide a back cover plate 1ᵃ for said casing 1, having a slot 16'' to guide the stud 16' on the nut 16 and prevent turning movement of the latter. Said plate is secured by the nut 1ᵇ on the threaded end of the stop stud 76 shown in Fig. V and is prevented from turning by engagement of the anchor stud 55 in a hole in said plate.

Said apparatus may be operated as follows: The conduit 8 is connected, conveniently by a hose with a terminal chuck valve, to a tire or other air receiver containing less than the selected pressure of, say, thirty-five pounds, and air thus allowed to pass from diaphragm chamber 3 to such receiver. The air pressure within chamber 3 is thus reduced, and as that pressure approaches said selected pressure, spring 15 draws the upper arm 11'' of bell crank lever 11 to the left, in Fig. III. When the pressure in diaphragm chamber 3 is thus lowered to thirty-five pounds, lever arm 11'' has thus moved far enough for stud 11ᵃ to engage the left end of slot 48' in push link 48 and move the latter, to the left, with consequent movement of the upper end of cam rocker lever 56, to the left, far enough to move the crest of its cam 56' to an unstable position. Consequently, spring 59 pulls roller 56ᵃ, by lever 58, downward along the right hand incline of cam 56', turning rocker cam lever 56 counterclockwise and thrusting link 47 and push rod 46' to the left and thereby thrusting valve 46 open, until the lower end of cam lever 56 stops against stud 75. The highly compressed air is thus allowed to flow from the source through supply conduit 6 and passage 41, past valve 46 and through air conduit 45 and T-fitting 45' into diaphragm chamber 2, faster than it can escape through the restricted vent 45ª, flexing diaphragm 4 upward and forcing plunger 49 to turn bell crank lever 50 counterclockwise against the stress of spring 54. As the arm 50'' of lever 50 moves to the left it carries with it the stud 50ª and both roller levers 58 and 65. Consequently, both cam rollers 56ª and 63ª are drawn upward along the right hand inclines of respective rocker cams 56' and 63'; pressing both counterclockwise. However, roller 63ª passes over the crest of rocker cam 63' before roller 56ª reaches the crest of cam 56' and, at that instant, spring 66 snaps roller 63ª, by lever 65, downward along the left incline of cam 63', so as to turn cam lever 63 clockwise and snap link 62 and push rod 61' and valve 61 to the left, opening valve 61, until the lower end of cam lever 63 stops against stud 76. Opening valve 61 allows the highly compressed air to flow from the supply conduit 6, through passage 43, conduit 6', T-fitting 8', conduit 8, hose and chuck valve, to the tire or other air receiver. After cam roller 63ª thus passes to the left of the crest on rocker cam 63' unseating valve 61; cam roller 56ª passes to the left of the crest on rocker cam 56' and causes cam lever 56 to turn clockwise to permit valve 46 to be closed by its spring 46ª to thus stop the flow of compressed air to diaphragm chamber 2. Such clockwise movement of the rocker cam lever 56 is stopped by its lower end encountering stop stud 76 or push link 48, while the signal is sounded by the crank 72 swinging the clapper lever 70' and ringing the bell 68 with the striker 70. The latter movement of the cam roller lever 58 stops with the roller 56ª on the left hand side of the cam 56', as shown in Fig. III.

After the valve 46 is closed, air escaping from beneath diaphragm 4 through the restricted vent 43ª, reduces the pressure beneath the diaphragm 4; thus permitting bell crank lever 50 to be turned clockwise by the stress of the spring 54. As the latter motion occurs, cam levers 58 and 65 are driven to the right, so that cam rollers 56ª and 63ª climb up the left hand inclines of the respective rocker cams 56' and 63', pressing both cam levers 56 and 63 clockwise. When roller 63ª passes to the right of the crest of cam 63', rocker cam lever 63 is snapped counterclockwise by roller 63ª pulled down by spring 66, and valve 61 is closed by its spring 61ª and stops the flow of air through valve 61 to conduit 6'.

During the period when valve 61 is open, air flows from the supply conduit 6 to the conduit 6' through fitting 8' and into the service conduit 8 and thence into the receiver. The relation between supply pressure, back pressure in the receiver, and the fluid resistance of the entire service conduit will determine whether or not the pressure in the diaphragm chamber 3 rises above the pressure for which the device is adjusted. If the pressure does not rise higher than the adjusted pressure, then the lever 11 will remain in its extreme counterclockwise position, limited by adjustment screw 11ᵇ. Whereupon, cam 56' will be restrained by push link 48 from returning fully to the position shown in Fig. III. If the pressure rises higher than the adjusted pressure, the cam lever 56 is stopped by its lower end encountering the stop stud 76. Upon return of lever 50, to the position shown in Fig. III, cam roller 56ª will pass over the crest of cam 56', turning cam 56' counterclockwise to initiate another cycle of operation. If the pressure within the tire is yet less than the selected pressure, pressure within diaphragm chamber 3 will remain below or be reduced to the selected pressure, by escape into the tire, and the cycle above described will be repeated until the pressure in diaphragm chamber 3 and in the tire and connecting conduits is equalized, and then bell crank lever arm 11'' is held as in Fig. III; preventing another opening of said valve 46, and bell 68 is silent, indicating completion of dispensation. Thereupon, conduit 8 may be disconnected from the tire, or other receiver, leaving the latter charged to very slightly above the selected pressure. Therefore, in such idle position of the apparatus, both of the valves 46 and 61 are closed and air of not less than the selected pressure is trapped in the diaphragm chamber 3; so that, when the pressure in chamber 3 is permitted to escape, as above described, or otherwise, a dispensing operation is initiated, by operation of mechanism including bell crank lever 11, and such mechanism exemplifies the "means for initiating" contemplated in certain of the claims. The mechanism including bell crank lever 50 exemplifies what is termed in certain of the claims "power mechanism", for limiting the charge of fluid dispensed without further control by said initiating means. It may be observed that in such apparatus as disclosed in Patent No. 1,655,003 aforesaid, the means for initiating the dispensing operation also controls the means for terminating the dispensing operation, contrary to the present invention.

However, I do not desire to limit myself to the specific details of construction, arrangement, or method of operation herein set forth, as it is obvious that various modifications may be made therein without departing from the essential features of my invention, as defined in the appended claims.

I claim:

1. In fluid dispensing apparatus, the combination of a source of fluid under pressure; a conduit adapted for connection with a receiver; a valve between said source and said conduit; means in operating relation to said valve; pressure sensitive means connected to said conduit and adapted to transfer an actuating impulse to said first means when the pressure in the conduit falls to that at which the apparatus is adjusted; said first means comprising means, responsive to said actuating impulse, to open said valve, to maintain said valve in open position for a predetermined period, and to close said valve in a cycle; whereby said cycle is completed, each time it is initiated, without further influence from said pressure sensitive means.

2. In fluid dispensing apparatus, the combination of a source of fluid under pressure; a conduit adapted for connection with a receiver; a valve between said source and said conduit; means in operating relation to said valve; adjustable pressure sensitive means connected to said conduit and adapted to transfer an actuating impulse to said first means when the pressure in the conduit falls to that at which the apparatus is adjusted; said first means comprising means, responsive to said actuating impulse, to open said valve, to maintain said valve in open position for a predetermined period, and to close said valve in a cycle; whereby said cycle is completed, each time it is initiated, without further influence from said pressure sensitive means.

3. In a fluid dispensing apparatus, the combination of a source of fluid under pressure; a conduit adapted for connection with a receiver; a valve between said source and said conduit; power mechanism in operating relation to said valve; pressure sensitive means connected to said conduit and adapted to transfer an actuating impulse to said power mechanism when the pressure in the conduit falls to that at which the apparatus is adjusted; said power mechanism comprising means, responsive to said actuating impulse, to open said valve, to maintain said valve in open position for a predetermined period, and to close said valve in a cycle; whereby said cycle is completed, each time it is initiated, without further influence from said pressure sensitive means.

4. In a fluid dispensing apparatus, the combination of a source of fluid under pressure; a conduit adapted for connection with a receiver; a valve between said source and said conduit; power mechanism in operating relation to said valve; adjustable pressure sensitive means connected to said conduit and adapted to transfer an actuating impulse to said power mechanism when the pressure in the conduit falls to that at which the apparatus is adjusted; said power mechanism comprising means, responsive to said actuating impulse, to open said valve, to maintain said valve in open position for a predetermined period, and to close said valve in a cycle; whereby said cycle is completed, each time it is initiated, without further influence from said pressure sensitive means.

5. In a device for dispensing fluid, the combination of a source of supply; a conduit, adapted for connection with a receiver; pressure sensitive means adapted to transfer an actuating impulse upon reduction of the pressure in the conduit to a predetermined value; a valve between said source of supply and said conduit; valve controlling mechanism connected to the source of supply and adapted to receive said actuating impulse and to follow a predetermined cycle of opening said valve, maintaining said valve open for a predetermined period, and closing said valve independently of further influence from said pressure sensitive means.

6. In a device for dispensing fluid, the combination of a source of supply; a conduit, adapted for connection with a receiver; adjustable pressure sensitive means adapted to transfer an actuating impulse upon reduction of the pressure in the conduit to a predetermined value; a valve between said source of supply and said conduit; valve controlling mechanism connected to the source of supply and adapted to receive said actuating impulse and to follow a predetermined cycle of opening said valve, maintaining said valve open for a predetermined period, and closing said valve independently of further influence from said pressure sensitive means.

7. In fluid dispensing apparatus, the combination of a source of fluid under pressure; a conduit adapted for connection with a receiver; a valve between said source and said conduit; power mechanism in operating relation to said valve; a pressure sensitive diaphragm connected to said conduit and adapted to transfer an actuating impulse to said power mechanism when the pressure in the conduit falls to that at which the apparatus is adjusted; said power mechanism comprising means responsive to open said valve, to maintain said valve in open position for a predetermined period, and to close said valve in a cycle; whereby said cycle is completed, each time it is initiated, without further influence from said pressure sensitive means.

8. In fluid dispensing apparatus, the combination of a source of fluid under pressure; a conduit adapted for connection with a receiver; a valve between said source and said conduit; power mechanism in operating relation to said valve; an adjustable pressure sensitive diaphragm connected to said conduit and adapted to transfer an actuating impulse to said power mechanism when the pressure in the conduit falls to that at which the apparatus is adjusted; said power mechanism comprising means responsive to open said valve, to maintain said valve in open position for a predetermined period, and to close said valve in a cycle; whereby said cycle is completed, each time it is initiated, without further influence from said pressure sensitive means.

9. In fluid dispensing apparatus, the combination of a source of fluid under pressure; a conduit adapted for connection with a receiver; a valve between said source and said conduit; power mechanism in operating relation to said valve; adjustable means, for predetermining the pressure to which said receiver shall be charged, from substantially atmospheric pressure to that of said source; a pressure sensitive diaphragm, subjected to the pressure in said conduit and to opposing stress of said adjustable means, adapted to impart an actuating impulse to said power mechanism when the pressure in the conduit falls to that at which said first means is adjusted; said power mechanism comprising means to open said valve, to maintain said valve in open position for a predetermined interval, and to close said valve, after said interval, in a cycle in response to said actuating impulse; whereby each cycle, thus initiated, is completed without influence from said diaphragm during said cycle and such cycles are repeated automatically until the predetermined pressure is attained in said receiver.

10. In fluid dispensing apparatus, the combination with a casing inclosing two diaphragm chambers, each containing a reciprocatory diaphragm; of fluid pressure supply conduits leading to said chambers; a restricted vent from one chamber; a fluid pressure service conduit, adapted for connection to a receiver, leading from the other of said chambers; respective springs opposed to the fluid pressure on said diaphragms; means for adjustably varying the pressure of the spring opposed to the service pressure diaphragm; two valves for controlling respectively the passage of fluid to said diaphragm chambers; power mechanism in operating relation to said valve which controls passage of fluid to said chamber having said service conduit leading therefrom, said power mechanism comprising means, responsive to an actuating impulse, to open said valve, to maintain said valve in open position for a predetermined interval, and to close said valve, after said interval, in a complete cycle; and means, connected with said diaphragms, for automatically operating said valves in accordance with fluctuations in the fluid pressure on both diaphragms; whereby fluid is dispensed, in pulsations, from said supply conduit through said service conduit, until the pressure in the receiver is equal to the effective pressure of the adjusted spring.

11. In fluid dispensing apparatus, the combination with a casing inclosing two diaphragm chambers, each containing a reciprocatory diaphragm; of fluid pressure supply conduits leading to said chambers; a restricted vent from one chamber; a fluid pressure service conduit, adapted for connection to a receiver, leading from the other of said chambers; respective springs opposed to the fluid pressure on said diaphragms; means for adjustably varying the pressure of the spring opposed to the service pressure diaphragm; two valves for controlling respectively the passage of fluid to said diaphragm chambers; power mechanism in operating relation to said valve which controls passage of fluid to said chamber having said service conduit leading therefrom, said power mechanism comprising means, responsive to an actuating impulse, to open said valve, to maintain said valve in open position for a predetermined interval, and to close said valve, after said interval, in a complete cycle; and means, connected with said diaphragms, for automatically operating said valves in accordance with fluctuations in the fluid pressure on both diaphragms, including a rocker cam, and a cam roller cooperative therewith; whereby fluid is dispensed, in pulsations, from said supply conduit through said service conduit, until the pressure in the receiver is equal to the effective pressure of the adjusted spring.

12. In fluid dispensing apparatus, the combination with a casing inclosing two diaphragm chambers, each containing a reciprocatory diaphragm; of fluid pressure supply conduits leading to said chambers; a restricted vent from one chamber; a fluid pressure service conduit, adapted for connection to a receiver, leading from the other of said chambers; respective springs opposed to the fluid pressure on said diaphragms; means for adjustably varying the pressure of the spring opposed to the service pressure diaphragm; two valves for controlling respectively the passage of fluid to said diaphragm chambers; power mechanism in operating relation to said valve which controls passage of fluid to said chamber having said service conduit leading therefrom, said power mechanism comprising means, responsive to an actuating impulse, to open said valve, to maintain said valve in open position for a predetermined interval, and to close said valve, after said interval, in a complete cycle; and means, connected with said diaphragms, for automatically operating said valves in accordance with fluctuations in the fluid pressure on both diaphragms, including two rocker cams, and two cam rollers cooperative therewith; whereby fluid is dispensed, in pulsations, from said supply conduit through said service conduit, until the pressure in the receiver is equal to the effective pressure of the adjusted spring.

13. In fluid dispensing apparatus, the combination with a casing inclosing two diaphragm chambers, each containing a reciprocatory diaphragm; of fluid pressure supply conduits leading to said chambers; a restricted vent from one chamber; a fluid pressure service conduit, adapted for connection to a receiver, leading from the other of said chambers; respective springs opposed to the fluid pressure on said diaphragms; means for adjustably varying the pressure of the spring opposed to the service pressure diaphragm; two valves for controlling respectively the passage of fluid to said diaphragm chambers; power mechanism in operating relation to said valve which controls passage of fluid to said chamber having said service conduit leading therefrom, said power mechanism comprising means, responsive to an actuating impulse, to open said valve, to maintain said valve in open position for a predetermined interval, and to close said valve, after said interval, in a complete cycle; and means, connected with said diaphragms, for automatically operating said valves in accordance with fluctuations in the fluid pressure on both diaphragms, including two bell crank levers respectively operatively related to the two diaphragms, and to said springs, two rocker cams, and two cam rollers cooperative therewith; whereby fluid is dispensed, in pulsations, from said supply conduit through said service conduit, until the pressure in the receiver is equal to the effective pressure of the adjusted spring.

VIRGIL D. BARKER.